March 17, 1936.  G. W. FERNSTRÖM  2,034,567

SEALED BEARING

Filed Feb. 7, 1935  2 Sheets-Sheet 1

INVENTOR.
Gustav Wallentin Fernström
BY Chas. Lyon Russell
his ATTORNEY.

March 17, 1936.   G. W. FERNSTRÖM   2,034,567
SEALED BEARING
Filed Feb. 7, 1935   2 Sheets-Sheet 2

INVENTOR.
Gustav Wallentin Fernström
BY
his ATTORNEY.

Patented Mar. 17, 1936

2,034,567

UNITED STATES PATENT OFFICE 2,034,567

SEALED BEARING

Gustav Wallentin Fernström, Goteborg, Sweden, assignor to Aktiebolaget Svenska Kullagerfabriken, Goteborg, Sweden, a corporation of Sweden Application February 7, 1935, Serial No. 5,334

9 Claims. (Cl. 308—187)

This invention relates to sealed or enclosed bearings and has for an object to provide a bearing of the "lubricated for life" type. Another object of the invention is to provide a bearing having relatively removable parts with members for holding a large supply of lubricant within the bearing. Another object of the invention is to provide a bearing enclosure which will retain the lubricant within the bearing for automatic application to the moving parts and which will effectively seal the lubricant containing chamber against escape of the lubricant.

Another object of the invention is to provide an encased bearing which has members designed for retaining lubricant within the bearing and for preventing the entrance of foreign matter into the bearing.

Another object of the invention is to provide an improved form of sealing or enclosing plate for a bearing, particularly an anti-friction bearing, which will afford an oil tight seal between itself and the outer race of the bearing, and which carries resilient securing means and one which may be readily applied in position and securely attached for all practical purposes, which may be nevertheless, readily removed without injuring the race ring of the bearing by which it is carried.

In the drawings which accompany this specification, one practicable embodiment of my invention is illustrated. I have shown sealing or encasing plates applied to the outer race of a ball bearing, this at the present time being the preferred form of my invention, in which drawings Figure 1 is a section of the upper portion of a bearing embodying my invention, taken on an axial plane.

Figure 1:
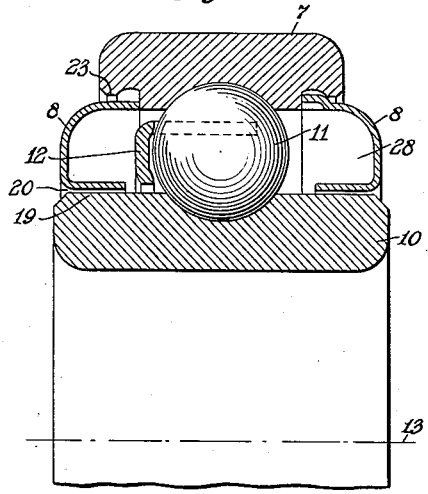
Figure 2:
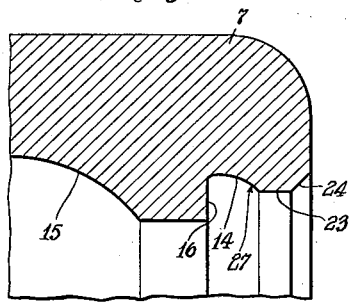
Figure 2 is an enlarged section of a portion of the outer race ring.
Figure 6:
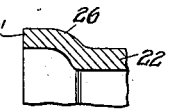
Figure 5 is an enlarged edge view of one of the bulges at the outer edge of the sealing plate and Figure 6 is also an enlarged detail view showing an axial section of a portion of the plate at the bulge, these two latter details being shown in the same scale as is the detail shown in Figure 2.
Figure 3:
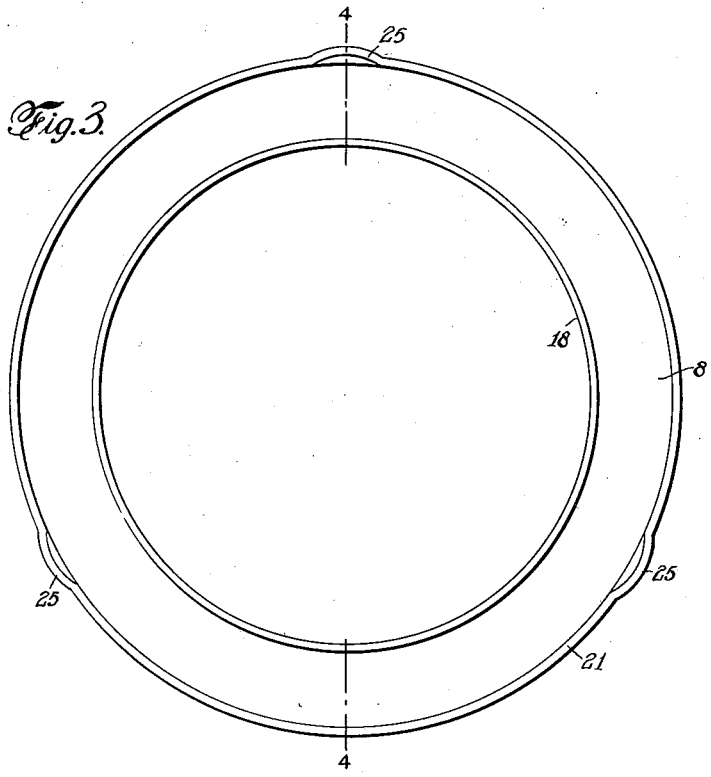
Figure 3 is an edge view of one of the enclosing or sealing plates detached from the bearing, the direction of view being from inside the bearing outwardly.
Figure 4:
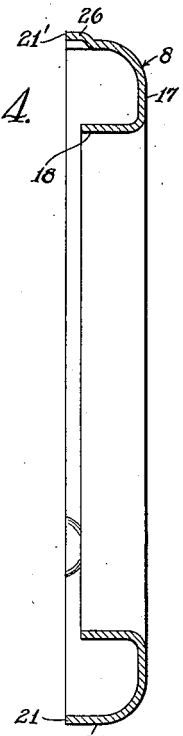
Figure 4 is an axial section of the sealing plate taken at about the plane of the line 4—4 in Figure 3 and its upper portion taken on the same plane as is the plane shown at the right hand side in Figure 1.
Figure 5:
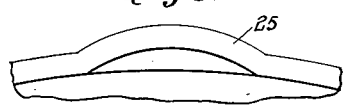

One of the difficulties in designing a sealed bearing is to obtain a structure which while being economical in manufacture and requiring small space, will still be easy to assemble and will effectively seal the bearing, especially at the outer ring. If the outer ring, as the ring 7 in the illustration, is the rotating member, the juncture between it and the sealing plates 8—8 is subjected to the pressure of the lubricant while thrown outwardly by centrifugal force. During times that the outer race is idle, either because the bearing is idle or the inner ring 10 is rotating, the joint between the outer race and the sealing plate is required at the bottom of the bearing to form the seal of an oil well.

In the present illustration, is shown my invention, embodied in an anti-friction bearing wherein the outer race 7 and the inner race 10 are held together by a row of balls 11, spaced apart by a suitable cage 12, the bearing being a deep groove ball bearing.

The outer ring 7 of the bearing shown in the drawings is considerably shorter on each side than is the inner bearing ring 10. In some cases it may be suitable to increase the width of the outer ring to equal that of the inner ring. This can be done without otherwise altering the outer ring. The center line of the bearing which is the geometrical axis of the bore of the inner ring 10 and is the axial line upon which the outer ring 7 rotates and upon which the series of balls 11 revolve, is indicated by the reference character 13.

The outer race ring 7 is formed with a circumferential groove 14 at each side of the race way 15 for the balls 11. Inwardly these grooves have plain side walls 16, the remainder of the groove being circular in profile.

The sealing plates or cups 8 are somewhat U shape in formation in section. There is what might be regarded as the bottom or bow 17 of the U. One of the side members 18 is shown formed substantially straight in the illustration, and as cylindrical to conform to the cylindrical outer face of the land 19, formed on the inner race ring. The inner perimeter of this portion of the plate is so formed that it will have a running clearance relation as at 20 with the outer perimeter of the land 19. The other side member 22 at and adjacent its outer edge 21 is substantially cylindrical and is so formed that in assembling the bearings this edge 21 freely passes the inner perimeter 23 of the land outwardly of the groove 14. Outwardly of this land 23, the side of the ring is preferably chamfered, a chamfer being indicated at 24. The edge of the sealing plate is illustrated as formed with a plurality of bulges 25, three being shown. These bulges preferably extend outwardly a sufficient distance beyond the radius of the land 23 that when the plate has been placed in position with its edge 21 abutting the face 16, the bulge will not only prevent the accidental displacement of the plate but by the spring action with which its outer curved face 26 engages the outer face 27 of the groove 14, the resiliency or spring action of the parts will be such that the edge 21 of the plate throughout its entire circumference, including the edge 21' of the bulge, is in oil sealing contact with the plain side wall 16. The space 28 between the side members 18 and 22 of the plates 8 of the respective sides of the bearing form a grease chamber or lubricant chamber in connection with the inside of the bearing.

Figure 7:
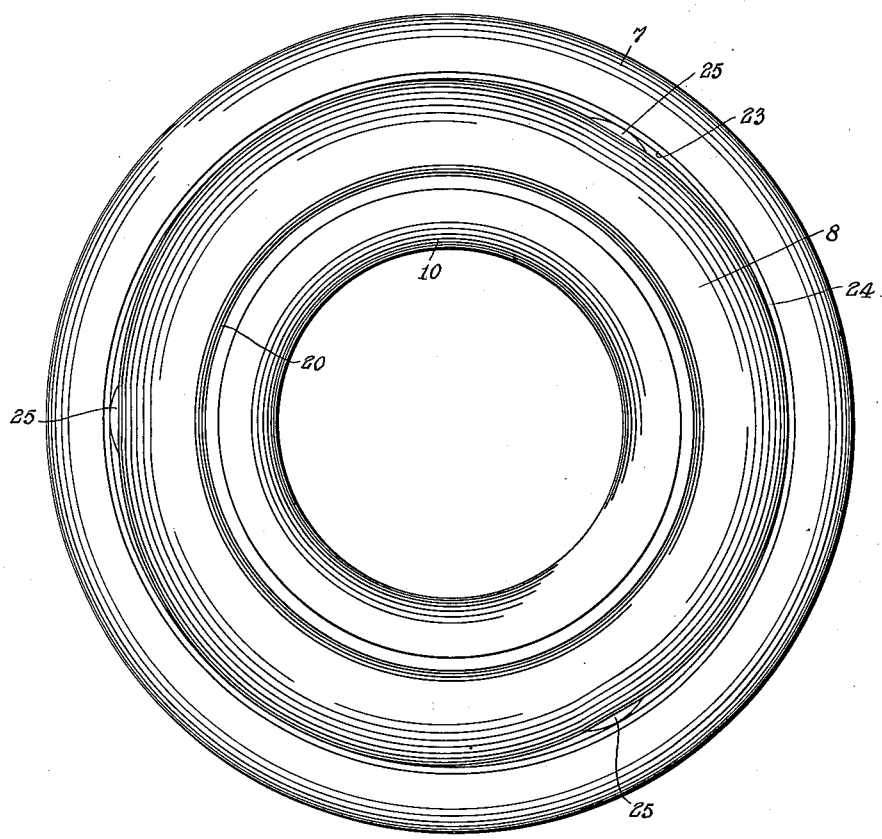
Figure 7 is a side view of the bearing showing a sealing plate under the process of insertion.

The sealing plates are inserted by springing the outer side member 22 in the vicinity of one or more of the bulges sufficiently to enable the bulges to pass through the opening defined by the perimeter of the land 23. The manner in which the sealing plate is deformed is shown in Figure 7. The insertion of the sealing plates is facilitated by the chamfer 24 which forces the bulges inwardly.

Preferably the bow portion 17 of each of the plates 8 is well within the outer length dimensions of the inner ring 10 of the bearing. That is the outer face of the bow 17 is, when the parts are properly assembled, well within the planes of the ends 29 of such inner rings. If desired the inner ring may however be made of a width equal to that of the outer ring.

It is the purpose of this invention to permit the manufacturer of the bearing to send it out containing a sufficient supply of lubricant of proper consistency, that it may be truly a bearing which is lubricated for life. This is made possible by having a seal between the wall 16 of the outer ring and the edge of the plate 8 so continuously tight that it will prevent the escape of any portion of the lubricant with which the bearing is supplied and to so locate and form the space 20 between the plate 8 and the inner race ring 10 that the lubricant within will not seep out. It is also necessary in many applications to prevent the entrance of various contaminating material to the bearing, among which may be mentioned oil or lubricant from other parts of the mechanism in which the bearing is mounted.

Although but one embodiment of my invention has been shown in the drawings and herein described by way of illustration, yet it will be apparent that changes can be made within the limits of the claims which will not detract from the spirit of my invention.

Having thus described my invention, I claim and desire to secure by Letters Patent:

1. In a device of the character described, the combination with an inner race ring for a bearing having extensions at the respective sides of its race way for the moving element, of an outer race ring having extensions at its sides much shorter than the extensions at the sides of the inner race way, the outer ring being formed on each side with an outwardly facing plane wall and outwardly thereof with an inwardly facing cam, and a plate having a circumferential edge adapted to engage such plane wall, there being cam engaging means carried by the plate outwardly of its edge for engaging the said cams and resiliently urging such edge against the said plane wall, each of the plates being U shaped in cross section.

2. In a device of the character described, the combination with an inner race ring for a bearing having extensions at the respective sides of its race way for the moving element, of an outer race ring having extensions at its sides much shorter than the extensions at the sides of the inner race way, the outer ring being formed on each side with an outwardly facing plane wall and outwardly thereof with an inwardly facing cam, and a plate having a circumferential edge adapted to engage such plane wall, there being cam engaging means carried by the plate outwardly of its edge for engaging the said cams and resiliently urging such edge against the said plane wall, each of the plates being U-shaped in cross section, the bow of the U lying within the plane of the side face of the inner ring.

3. In a device of the character described, the combination with an inner race ring for a bearing having extensions at the respective sides of its race way for the moving element, of an outer race ring having extensions at its sides much shorter than the extensions at the sides of the inner race way, there being grooves formed in the outer race ring outwardly of the race track therein, each of such grooves having a plane inner radial wall, the outer wall of such groove being formed on a curve slanting in relation to the axis of the ring, and a plate having a circumferential edge adapted to engage such plane wall, there being a plurality of bulges formed in the material of the plate at and outwardly of its edge for engaging the cam face of the groove and resiliently urging such edge against the said plane wall, each of the plates being U-shaped in cross section, the bow of the U lying within the plane of the side face of the inner ring.

4. In a device of the character described, the combination with an inner race ring for a bearing of an outer race ring, there being grooves formed in the outer race ring outwardly of the race track therein, each such groove having an outwardly facing wall and an inwardly facing wall cam face opposed to the outwardly facing wall and a cupped plate having an outer substantially cylindrical portion, a circumferential edge adapted to engage such outwardly facing wall, there being a plurality of bulges formed in the material of the plate at and outwardly of its edge for engaging the cam face of the grooves and resiliently urging such edge against the said outwardly facing wall.

5. In a device of the character described, the combination with an inner race ring for a bearing having extensions at the respective sides of its race way for the moving element, of an outer race ring having extensions at its sides, the outer ring being formed on each side with an outwardly facing substantially plane wall and outwardly thereof with an inwardly facing cam, and a plate having a bent over circumferential edge in engagement with the outwardly facing wall of the groove, there being cam engaging means carried by the plate outwardly of such edge, engaging the said cam and resiliently urging such edge against the said groove wall.

6. In a device of the character described, the combination with an inner race ring for a bearing having extensions at the respective sides of its race way for the moving element, of an outer race ring having extensions at its sides, the outer ring being formed on each side with an outwardly facing substantially plane wall and outwardly thereof with an inwardly facing cam, and a plate formed with a substantially cylindrical portion having a circumferential edge in engagement with the outwardly facing wall of the groove, there being cam engaging means carried by the plate outwardly of such edge engaging the said cam and resiliently urging such edge against the said groove wall.

7. In a bearing structure, the combination with a bearing ring formed on its inner perimeter with a raceway for moving bearing elements, the ring having an extension at one side of the raceway, there being a groove formed in the inner perimeter of the extension leaving a land outwardly of the groove, it being of greater diameter than is the diameter of the land inwardly of the groove, the inner wall surface of the groove facing outwardly toward the side of the ring, of a plate having a bent over circumferential edge in engagement with the outwardly facing wall of the groove and engaging means carried by the plate outwardly of such edge for engaging the inwardly directed face of the groove and holding such edge against the said outwardly facing wall.

8. In a bearing structure, the combination with a bearing ring formed in its inner perimeter with a raceway, having extensions at the sides for moving bearing elements, the ring having an extension on at least one side of the raceway, there being a groove formed in the inner perimeter of each extension leaving a land outwardly of the groove, it being of greater diameter than is the diameter of the land inwardly of the groove, the inner wall surface of the groove facing outwardly toward the side of the ring, of a plate having a bent over circumferential edge in engagement with the outwardly facing wall of the groove and engaging means carried by the plate outwardly of such edge for engaging the inwardly directed face of the groove and holding such edge against the said outwardly facing wall.

9. In a bearing structure, the combination with a bearing ring formed on its inner perimeter with a raceway for moving bearing elements, the ring having an extension on one side of the raceway, there being a groove formed in the inner perimeter of the extension leaving a land at each side of the groove, the land outwardly of the groove being of greater diameter than is the diameter of the land inwardly of the groove, the inner wall surface of the groove facing outwardly toward the side of the ring, of a plate having a bent over circumferential edge in engagement with the outwardly facing wall of the groove and engaging means carried by the plate outwardly of such edge for engaging the inwardly directed face of the groove and holding such edge against the said outwardly facing wall.

GUSTAV WALLENTIN FERNSTRÖM.